F. A. GROVES.
TRUSSED AXLE.
APPLICATION FILED JAN. 2, 1914.
1,120,933.
Patented Dec. 15, 1914.
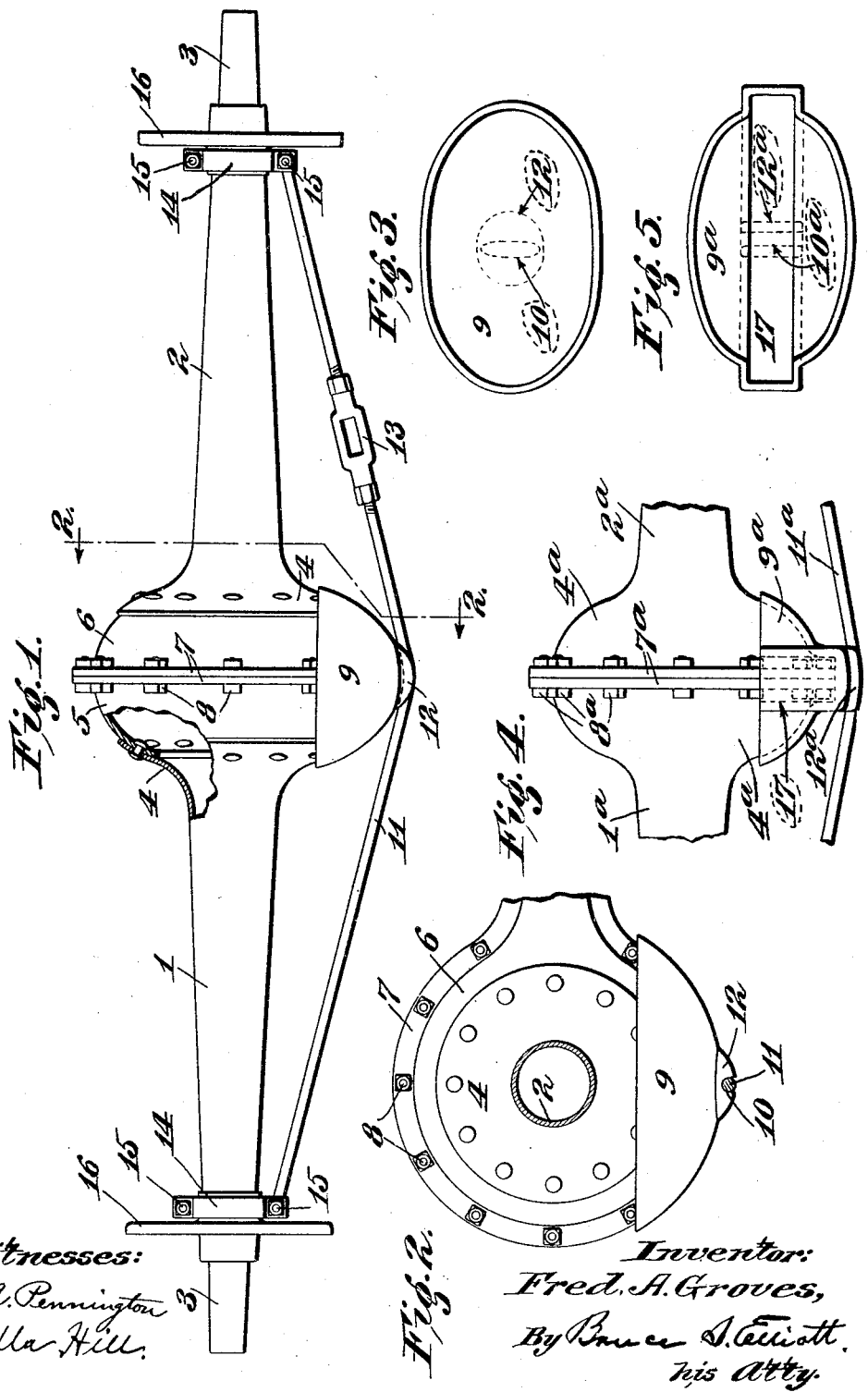

UNITED STATES PATENT OFFICE.

FREDERICK A. GROVES, OF CAPE GIRARDEAU, MISSOURI.

TRUSSED AXLE.

1,120,933.  Specification of Letters Patent.  Patented Dec. 15, 1914.

Application filed January 2, 1914. Serial No. 809,815.

*To all whom it may concern:*

Be it known that I, FREDERICK A. GROVES, a citizen of the United States, residing in Cape Girardeau, in the county of Cape Girardeau and State of Missouri, have invented new and useful Improvements in Trussed Axles, of which the following is a specification.

This invention relates to trussed axle structures, and more particularly to driving axles for motor vehicles.

It has for its principal objects to produce a strut member which will serve as a reinforcement for the axle housing; to provide for the application of such a strut member to axle housings of different constructions; and to attain certain advantages which will hereinafter more fully appear.

The invention consists in the parts and in the arrangements and combinations of parts hereinafter described and claimed.

In the drawing—Figure 1 is a rear elevation of a trussed driving axle housing of the sectional or built-up type; Fig. 2 is a section on the line 2—2 of Fig. 1; Fig. 3 is a top plan view of the strut member detached; Fig. 4 is a fragmentary rear elevation of the middle portion of an axle housing illustrating a modification of the invention; and Fig. 5 is a plan view of the strut member shown in Fig. 4.

Referring now more particularly to Figs. 1 to 3, inclusive, the axle housing therein shown comprises two tubular sections 1, 2. The outer end portions of these sections are provided with skeins or spindles 3 on which the wheels are adapted to be mounted; while the inner end portions of said sections are flared, as at 4, and riveted to a differential gear housing comprising two sections 5, 6, said housing sections being flanged, as at 7, and secured together by bolts 8.

A cup-shaped strut member 9 is fitted over the lower jointed portions of the housing sections 1, 2, and the gear housing sections 5, 6, said strut member being of elliptical formation and corresponding substantially to the contour of the housing sections so as to fit snugly thereagainst throughout the greater portion of the surface thereof. The strut member is provided on its bottom with a grooved seat 10 for the truss rod 11. This seat may be provided in any desirable way, but it is preferable to provide a button or lug 12 on the bottom of the strut member and form a groove therein.

As shown, the truss rod is in two sections which are coupled together by a turn-buckle 13. The outer ends of the truss rod may be secured to the sections 1, 2, of the axle housing in any desirable manner. As shown in Fig. 1 they are secured to split rings 14 which are clamped by bolts 15 on the housing sections adjacent to the flanges 16 which are usually provided to carry parts of the brake mechanism.

In Fig. 4 the separate gear housing sections are eliminated and the sections $1^a$ and $2^a$ of the axle housing have flared enlargements $4^a$ which are flanged at their meeting portions, as at $7^a$, and are secured by bolts $8^a$. In this modification the strut member $9^a$ is shaped to fit the adjacent portions of the housing more snugly throughout, and to accomplish this the strut member is grooved, as at 17, to receive the bolted flange portions of the housing sections. In other respects the structure is similar to that shown in Fig. 1, the tension rod $11^a$ being seated in a groove $10^a$ in a lug $12^a$ on the rib provided for the grooved portion 17.

The cup-shaped strut member, in addition to its function as a strut between the compression and tension members of the beam, serves to reinforce the joined portions of the housing sections, and relieves the strain upon the bolts and rivets at the place where there is a tendency for them to break. The strut member may be made of cast metal, forgings, or stampings, as desirable, and also may be made in numerous shapes other than those shown in the drawing; and it is not limited in its utility to housing structures like those shown in the drawing, but may be applied to a single-piece housing, or one made of two longitudinal parallel sections whose seams are welded or otherwise joined. Therefore, I do not wish to be limited to the exact construction and arrangement shown.

I claim:

1. In a trussed axle structure, a housing having an enlargement intermediate its ends, a cup-shaped strut member on said enlargement, and a tension rod coöperating with said strut member and said housing.

2. In a trussed axle structure, a housing having an enlargement intermediate its ends, a cup-shaped strut member fitted detachably on said enlargement, said strut member having a seat for the tension rod, and a tension rod engaged in said seat and secured at its ends to said housing on opposite sides of said enlargement.

3. In a trussed axle structure, a sectional axle beam, the meeting end portions of the sections of said beam being enlarged and connected, a strut member engaging said enlarged connected portions of the beam sections so as to bind them together, and a tension rod coöperating with said strut and the respective sections of said beam.

4. In a trussed axle structure, two beam sections connected at their meeting ends, a strut member having an interfitting engagement with said beam sections adjacent to their meeting ends so as to prevent separation thereof, and a tension rod coöperating with said strut and the respective beam sections.

In testimony whereof, I have hereunto set my hand in presence of two subscribing witnesses.

FRED. A. GROVES.

Witnesses:
    ELBERT E. VOGELSANGER,
    ALEX EAKINS.

Copies of this patent may be obtained for five cents each, by addressing the "Commissioner of Patents, Washington, D. C."